R. W. D. JÖRGENSEN.
RESTRAINING HARNESS.
APPLICATION FILED NOV. 4, 1911.

1,067,346.

Patented July 15, 1913.

UNITED STATES PATENT OFFICE.

RUDOLF W. D. JÖRGENSEN, OF MOSEBY, FALSTER, DENMARK.

RESTRAINING-HARNESS.

1,067,346.  Specification of Letters Patent.  Patented July 15, 1913.

Application filed November 4, 1911. Serial No. 658,605.

*To all whom it may concern:*

Be it known that I, RUDOLF WALDEMAR DENCHER JÖRGENSEN, a subject of the King of Denmark, residing at Moseby, Falster, Denmark, have invented new and useful Improvements in Restraining - Harness, of which the following is a specification.

My invention relates to a restraining harness for use with cows to prevent them from relieving themselves from the semen after being covered. The restraining harness which forms the object of this invention renders it difficult for the cows to effect the movements that would enable them to relieve themselves from the semen.

The object of the invention is illustrated in the accompanying drawing, in which—

Figure 1:
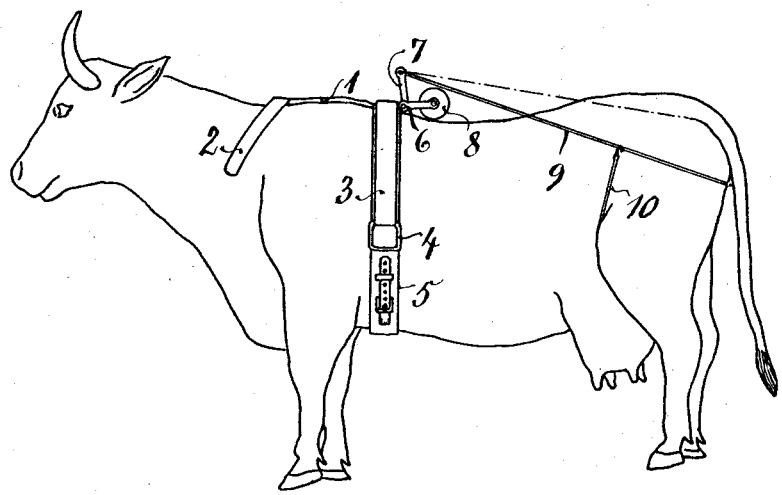
Figure 2:
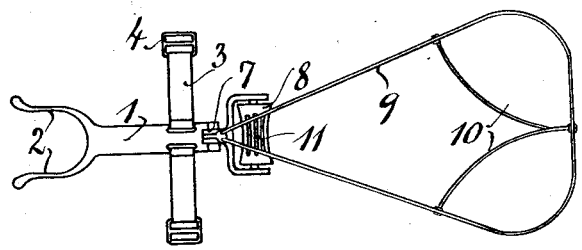

Figure 1 shows the restraining harness arranged upon a cow, in side view, and Fig. 2 a plan view of the harness.

1 is a slit iron plate forked in front so that the two branches 2 of the fork are able to engage the cow's neck and which in conjunction with two rods 3 suspended from the plate 1 serve to retain the plate in place upon the shoulder portions of the cow's back. The rods 3 end in eyes 4 through which a belly band 5 is carried for tightening the restraining harness. At its rear portion the plate 1 carries a bolt 6 around which the bent lever 7 is rotatable. The lower, rearwardly directed arm of the lever is forked and carries some suitable implement, such as a roller 8 for example, while the front upwardly directed arm comprises an eye or the like for securing a cord 9, which is passed around the hind quarters of the cow beneath its tail.

10 are cords fastened to the cord 9 and carried between the leg and the body; they are hooked to the cord 9 so that the latter is unable to slide upward.

The length of the cord 9 is such that when the cow stands quietly the roller 8 rests lightly upon its back and cannot worry or impede it in making normal movements. As soon as the animal begins to make violent movements, however, the cord 9 is tightened so that the roller 8 is pressed down onto the ridge of the back so long as the animal tries to relieve itself from the semen. The pressure exerted by the roller upon the animal's back will speedily render it quiet. In order to increase the efficacy of the roller 8 it can be furnished with ribs 11, nipples or the like.

Instead of carrying the cord 9 around the hind quarters of the animal by means of the cords 10 around its leg it can be carried from the lever 7 directly beneath the root of the tail so that the cords 10 can be dispensed with.

The manner of mounting the roller 8 and its construction and also the means for retaining the restraining harness in its correct position can be arranged in a different manner from that represented in the drawing.

Having thus described my invention, I declare that what I claim is:

1. An apparatus for preventing flexure or humping of animals during or subsequent to the act of copulation comprising in combination, mechanism embracing the body of the animal at spaced points, and a device operative by said mechanism against a portion of the body of the animal upon humping or flexure thereof, substantially as described.

2. An apparatus for preventing flexure or humping of animals during or subsequent to the act of copulation comprising in combination, mechanism embracing the body of the animal at spaced points, and a device operative against the backbone of the animal upon tension of said mechanism due to flexure or humping of the body, substantially as described.

3. A harness for restraining flexure or humping of the body of an animal during or subsequent to the act of copulation comprising in combination, a belly band, a device movably mounted thereon and adapted to impinge against a portion of the body of the animal, and means extending about the rump of the animal and adapted to operate said device upon humping movement of the animal's body, substantially as described.

4. A harness for restraining flexure or humping of the body of an animal during or subsequent to the act of copulation comprising in combination, a belly band, a forked extension thereon extending about the shoulder portions of the animal, a device movably mounted on said belly band and adapted to impinge against a portion of the body of the animal, and means extending about the rump of the animal and adapted to operate said device upon humping movement by the animal, substantially as described.

5. A harness for restraining flexure or humping of the body of an animal during or subsequent to the act of copulation comprising in combination, a belly band, a bell crank lever mounted on the belly band and provided with an abrasive element adapted to impinge against the backbone of the animal, and a flexible element connected with said bell crank lever and extending about the rump of the animal for operating said lever upon humping movement of the animal, substantially as described.

In testimony whereof I affix my signature in presence of two witnesses.

R. W. D. JÖRGENSEN.

Witnesses:
BEMH. LARSEN,
GEORG V. NIELSEN.

Copies of this patent may be obtained for five cents each, by addressing the "Commissioner of Patents, Washington, D. C."